(12) United States Patent
Ma et al.

(10) Patent No.: US 6,940,799 B1
(45) Date of Patent: Sep. 6, 2005

(54) METHOD FOR GENERATING A SIGNAL FOR DETECTING THE DIRECTION OF MOVEMENT OF A LASER SPOT, AND APPARATUS THEREFOR

(75) Inventors: Byung-in Ma, Suwon (KR); Byoung-ho Choi, Suwon (KR); Tae-youn Lee, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 893 days.

(21) Appl. No.: 09/691,059

(22) Filed: Oct. 19, 2000

(30) Foreign Application Priority Data

Oct. 21, 1999 (KR) .......................................... 1999-45853

(51) Int. Cl.[7] .................................................. G11B 3/90
(52) U.S. Cl. .............................. 369/53.25; 369/53.28; 369/124.14
(58) Field of Search .......................... 369/44.25, 44.41, 369/47.45, 53.11, 53.25, 53.28, 53.29, 53.38, 53.39, 53.4, 124.14

(56) References Cited

U.S. PATENT DOCUMENTS

| | | | | |
|---|---|---|---|---|
| 4,858,216 A | * | 8/1989 | Kamiya | 369/44.14 |
| 5,130,963 A | * | 7/1992 | Kusano et al. | 369/44.28 |
| 5,206,848 A | * | 4/1993 | Kusano et al. | 369/44.41 |
| 5,939,714 A | * | 8/1999 | Park | 250/231.16 |
| 6,028,826 A | * | 2/2000 | Yamamoto et al. | 369/44.35 |
| 6,388,964 B2 | * | 5/2002 | Watabe | 369/44.26 |

* cited by examiner

*Primary Examiner*—Paul W. Huber
(74) *Attorney, Agent, or Firm*—Stein, McEwen & Bui, LLP (57) ABSTRACT

A method and apparatus for detecting the direction of movement of a laser spot in an optical disc recording/reproducing apparatus having a photodetector divided into two or more sections, each of which is a light receiving device, aligned in a radial direction that includes detecting a phase difference between the light receiving signals corresponding to light receiving devices of the photodetector. A first phase difference signal is obtained that indicates the degree to which the phase of the light receiving signal corresponding to a first light receiving device farthest advanced in the radial direction leads the phase of the light receiving signal corresponding to a second light receiving device. A second phase difference signal is obtained that indicates the degree to which the phase of the light receiving signal corresponding to the second light receiving device leads the phase of the light receiving signal corresponding to the first light receiving device. The first and second phase difference signals are integrated and then added to each other to obtain a signal that indicates the direction of movement of the laser spot. The direction of movement of the laser spot is detected according to whether the phase of the direction detecting signal leads or lags the phase of a tracking error signal.

33 Claims, 10 Drawing Sheets

METHOD FOR GENERATING A SIGNAL FOR DETECTING THE DIRECTION OF MOVEMENT OF A LASER SPOT, AND APPARATUS THEREFOR

CROSS-REFERENCE TO RELATED APPLICATIONS

This application claims the benefit of Korean Application No. 99-45853, filed Oct. 21, 1999, in the Korean Industrial Property Office, the disclosure of which is incorporated herein by reference.

BACKGROUND OF THE INVENTION

1. Field of the Invention

The present invention relates to an optical recording/reproducing device, and more particularly, to a method for generating a signal for detecting the direction of movement of a laser spot and detecting the direction of movement of a laser spot, and apparatuses therefor.

2. Description of the Related Art

Track searching of an optical recording/reproducing apparatus means searching for a target track by moving an optical pick-up in the radial direction of a disc. In track searching, it is necessary to determine whether the optical pick-up moves in an intended direction.

Using a conventional method, the direction of movement of a laser spot is detected by the envelope of a sum signal generated by a photodetector. However, in the case of a high density optical disc such as a high-definition DVD (HD-DVD), the width of a track with respect to the size of a laser spot is much smaller than in a conventional CD/DVD. Accordingly, a crosstalk component caused by an adjacent track is mixed with the sum signal. Therefore, it is difficult to detect the envelope of the sum signal.

Figure 1A:
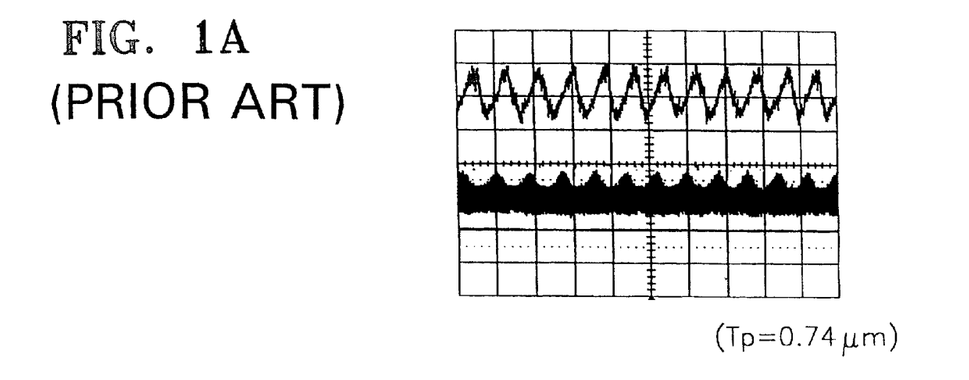
FIGS. 1A through 1C show changes in a track error signal and an RF signal according to changes in an optical spot and a track width.
Figure 1B:
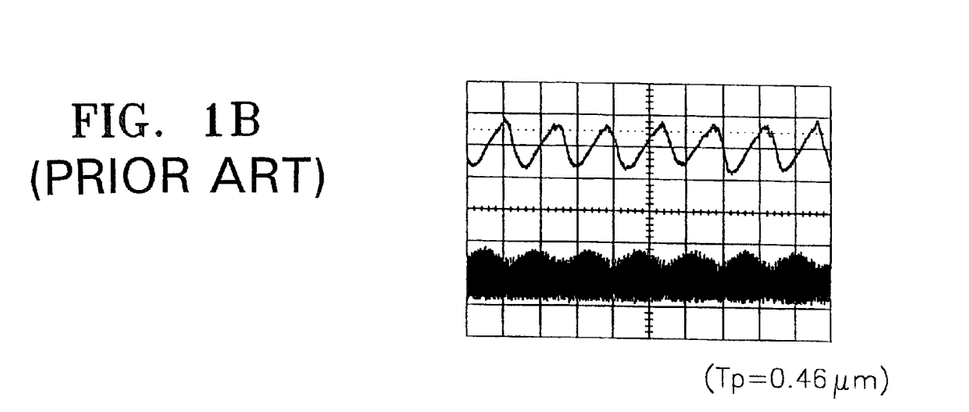
Figure 1C:
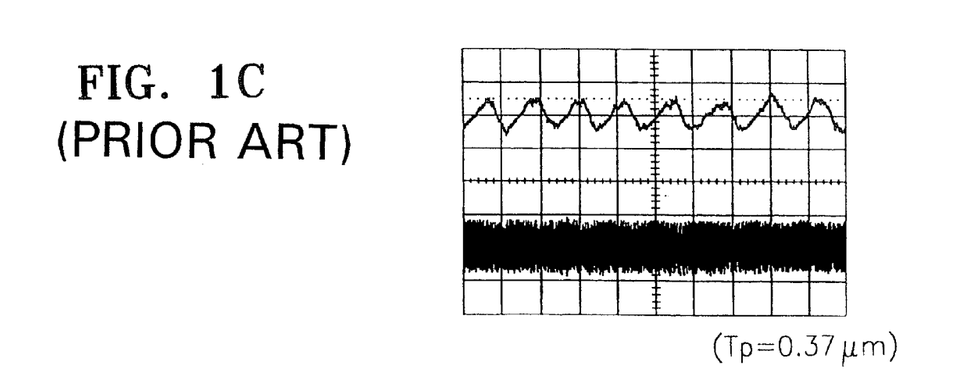

FIGS. 1A through 1C show changes in a track error signal and an RF signal according to changes in an optical spot and a track width. FIGS. 1A, 1B, and 1C show the track error signals and sum signals when the optical wavelength is 400 nm, the numerical aperture (NA) of an objective lens is 0.6, and track pitches are 0.74 $\mu$m (in the case of a DVD), 0.46 $\mu$m, and 0.37 $\mu$m, respectively.

As shown in FIGS. 1A through 1C, it is difficult to detect the envelope of the sum signal since the track pitch with respect to a uniform optical spot becomes narrower. This is because crosstalk caused by an adjacent track increases due to a narrow track pitch.

Therefore, it is difficult to detect the direction of movement of the laser spot, on the basis of the envelope of the sum signal since the track pitch with respect to the laser spot becomes narrower. This means that it is difficult to detect a track in a high density optical disc.

SUMMARY OF THE INVENTION

To solve the above problems, it is an object of the present invention to provide a method for generating a signal for detecting the direction of movement of a laser spot for use with a high density disc with narrow tracks.

It is another object of the present invention to provide a method for detecting the direction of movement of a laser spot using the direction detecting signal.

It is a further object of the present invention is to provide an apparatus using the above methods.

Additional objects and advantages of the invention will be set forth in part in the description which follows and, in part, will be obvious from the description, or may be learned by practice of the invention.

Accordingly, to achieve the above and other objectives, there is provided a method for generating a signal for detecting the direction of movement of a laser spot in an optical disc recording/reproducing apparatus having a photodetector divided into two or more sections, each of which is a light receiving device aligned in a radial direction, the method comprising detecting a phase difference between light receiving signals corresponding to light receiving devices of the photodetector and obtaining a first phase difference signal showing the degree to which the phase of the light receiving signal corresponding to a first light receiving device in the radial direction leads the phase of the light receiving signal corresponding to a second light receiving device, and a second phase difference signal showing the degree to which the phase of the light receiving signal corresponding to the second light receiving device leads the phase of the light receiving signal corresponding to the first light receiving device, integrating the first and second phase difference signals, and adding the integrated first and second phase difference signals to each other to obtain the direction detecting signal.

In another embodiment of the present invention, there is provided a method for detecting the direction of movement of a laser spot in an optical disc recording/reproducing apparatus having a photodetector divided into two or more sections, each of which is a light receiving device, aligned in a radial direction, the method comprising detecting a phase difference between the receiving signals corresponding to light receiving devices of the photodetector and obtaining a first phase difference signal showing the degree to which the phase of the light receiving signal corresponding to a first light receiving device farthest advanced in the radial direction leads the phase of the light receiving signal corresponding to a second light receiving device, and a second phase difference signal showing the degree to which the phase of the light receiving signal corresponding to the second light receiving device leads the phase of the light receiving signal corresponding to the first light receiving device, integrating the first and second phase difference signals, adding the integrated first and second phase difference signals to each other, obtaining a signal that indicates the direction of movement of the laser spot, and detecting the direction of movement of the laser spot according to whether the phase of the direction detecting signal leads or lags the phase of a tracking error signal.

In a still further embodiment of the present invention, there is provided an apparatus to generate a signal that detects the direction of movement of a laser spot in an optical disc recording/reproducing apparatus having a photodetector divided into two or more sections, each of which is a light receiving device aligned in a radial direction, the photodetector to generate light receiving signals corresponding to the intensity of the laser spot reflected from a disc, the apparatus comprising a differential phase detector to detect a phase difference between the light receiving signals corresponding to the light receiving devices of the photodetector and, in particular, to detect a first phase difference signal that shows the degree to which the phase of a light receiving signal corresponding to a first light receiving device farthest advanced in the radial direction leads the phase of a light receiving signal corresponding to a second light receiving device, and a second phase difference signal showing the degree to which the phase of the light receiving signal corresponding to the second light receiving device leads the phase of the light receiving signal corresponding to the first light receiving device, first and second integrators to integrate the first and second phase difference signals corresponding to the differential phase detector, and an adder to generate a direction detecting signal to detect the direction of movement of a laser spot by adding the integrated phase difference signals corresponding to the first and second integrators, respectively.

In another embodiment of the present invention, there is further provided an apparatus to detect the direction of movement of a laser spot in an optical disc recording/ reproducing apparatus having a photodetector divided into two or more sections, each of which is a light receiving device, aligned in a radial direction, the photodetector to generate light receiving signals corresponding to the light intensity of the laser spot reflected from a disc, the apparatus comprising a differential phase detector to detect a phase difference between the light receiving signals corresponding to the light receiving devices of the photodetector and, in particular, to detect a first phase difference signal to show the degree to which the phase of a light receiving signal corresponding to a first light receiving device farthest advanced in the radial direction leads the phase of a light receiving signal corresponding to a second light receiving device, and a second phase difference signal to show the degree to which the phase of the light receiving signal corresponding to the second light receiving device leads the phase of the light receiving signal corresponding to the first light receiving device, in the photodetector, first and second integrators to integrate the first and second phase difference signals corresponding to the differential phase detector, and an adder to generate a direction detecting signal to detect the direction of movement of a laser spot by adding the integrated phase difference signals and a direction detector to detect the direction of movement of the laser spot according to whether the phase of the direction detecting signal provided by the adder leads or lags the phase of a tracking error signal.

BRIEF DESCRIPTION OF THE DRAWINGS

The above objects and advantages of the present invention will become more apparent by describing in detail a preferred embodiment thereof with reference to the attached drawings in which.

DESCRIPTION OF THE PREFERRED EMBODIMENTS

Hereinafter, the structure and operation of the present invention will be described in detail with reference to the attached drawings.

FIGS. 2A through 2F, schematically shows waveforms illustrating a method for detecting the direction of movement of a laser spot according to an embodiment of the present invention.

Figure 2A:
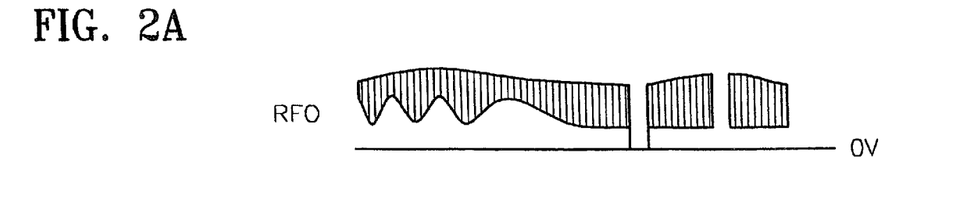
FIGS. 2A through 2F show waveforms that schematically illustrate a method for detecting the direction of movement of a laser spot, according to conventional technology.

1) the RF signal RF0 shown in FIG. 2A is obtained by adding light receiving signals generated by the respective light receiving devices of the photodetector to each other. Here, RF0 corresponds to a common sum signal.

The change in the level of the upper envelope is caused by a change in the reflection factor of a disc. The reflection factor of a disc partially changes according to position on the disc.

In the lower envelope, a trough corresponds to a track center (i.e., a pit) and a crest corresponds to a mirror. The reason why the crest does not coincide with the mirror level is that a signal level deteriorates due to crosstalk between adjacent tracks. In the case where the distance between the crests is short, the pit is positioned in an adjacent track on a locus along which the optical spot moves. In the case where the distance between the crests is long, the pit is not positioned on the adjacent track. The reason why the upper envelope overlaps the lower envelope in the RF signal is that the real locus of the optical spot does not transect the track at an angle of 90 degrees, but transects the track at a very small angle since, even though an optical pick-up moves in the radial direction of a disc, the disc rotates during a search operation. This effect causes a high frequency component determined by the pit formed in the track to be generated. The high frequency component is the RF signal.

As shown in FIG. 2A, the parts of the RF signal due to dust and scratches are omitted.

Figure 2B:
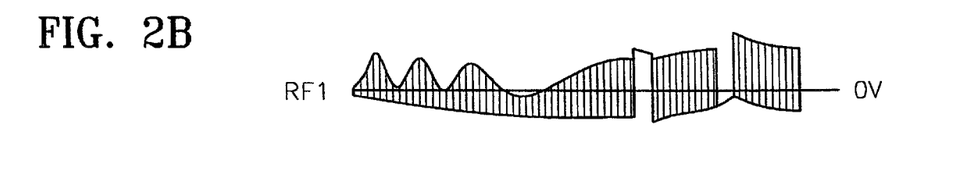

2) the signal RF1 shown in FIG. 2B is obtained by removing a direct current (DC) component by performing AC coupling using a capacitor in order to facilitate detection of the envelopes.

Figure 2C:
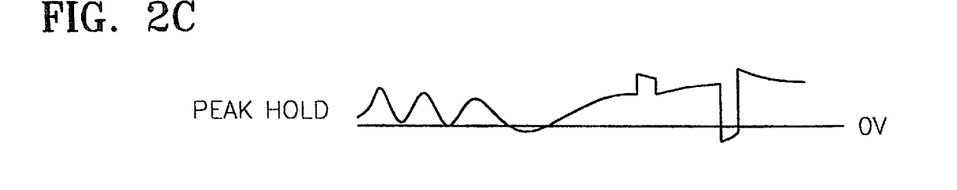
Figure 2D:
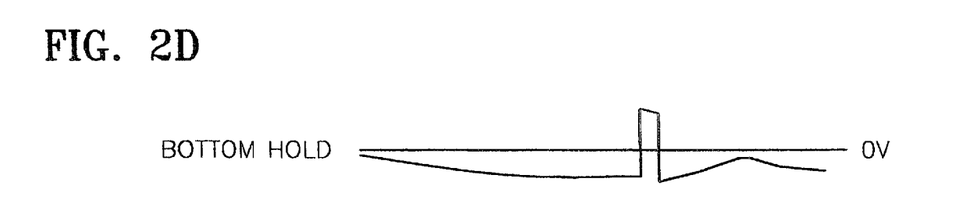

3) the peak signal and the bottom signal shown in FIGS. 2C and 2D are obtained by performing peak hold and bottom hold on the RF1 signal.

Figure 2E:
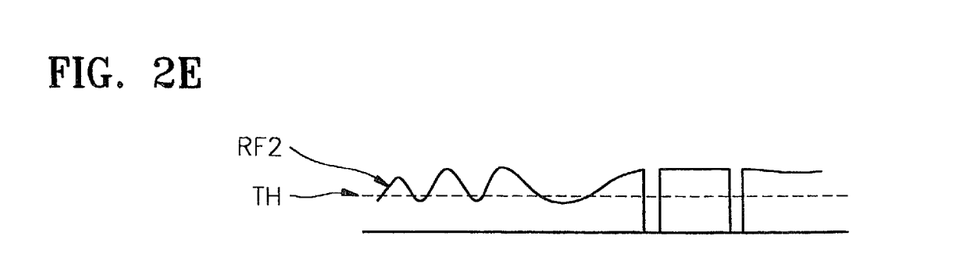

4) the difference signal RF2 shown in FIG. 2E is obtained by subtracting the bottom signal from the peak signal.

Figure 2F:
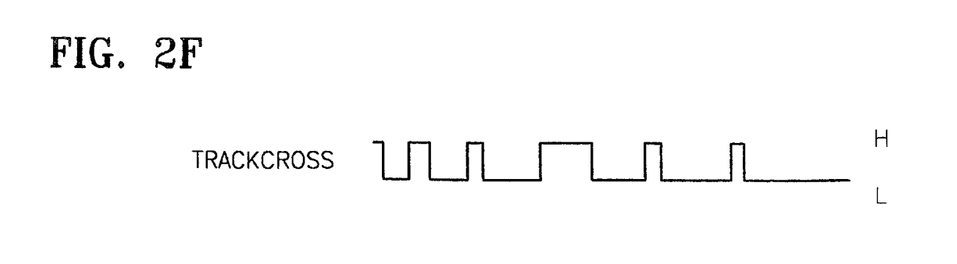

5) the track cross signal shown in FIG. 2F is obtained by binarizing the difference signal RF2 by a predetermined threshold value TH. Here, the threshold value TH is determined by the average of the peak hold signal shown in FIG. 2C and the bottom hold signal shown in FIG. 2D. The threshold value TH, while shown as being uniform in FIG. 2E, can change due to changes in the level of the peak hold signal and the level of the bottom hold signal.

When the track cross signal shown in FIG. 2F is compared with the track cross signal shown in FIG. 2A, it is noted that the track cross signal shown in FIG. 2F is a pulse signal, which is at a low level in the trough of the lower envelope shown in FIG. 2A, and is at a high level in the crest of the lower envelope shown in FIG. 2A.

6) The direction of movement of a laser spot is detected by comparing the phase of the signal shown in FIG. 2F with the phase of a binarized track error signal. Since the track cross signal is generated corresponding to the shape of a track formed on a disc, and the phase of a track error signal changes by 180° according to the outer circumference and inner circumference of the disc, it is possible to detect the direction of movement of the disc by determining the relationship between the phase of the track cross signal and the phase of the track error signal.

However, while possible, it is difficult to use the method for detecting the direction of movement of the laser spot according to the conventional technology shown in FIGS. 2A through 2F for a high density disc having narrow tracks, since a circuit for detecting the direction of movement of the laser spot is complicated and it is difficult to detect the envelope of the RF signal as track pitch becomes narrower with respect to a uniform optical spot as shown in FIGS. 1A through 1C.

In the method for detecting the direction of movement of the laser spot according to an embodiment of the present invention, the phase difference between light receiving signals is used so that the direction of movement of the laser spot is correctly detected even though a large amount of crosstalk exists between adjacent tracks.

In the present invention, when a differential phase detection (DPD) method using a phase comparing method is used by an optical disc recording/reproducing apparatus, since one output of a phase comparator is subtracted from the other output of the phase comparator and the subtraction result is used as a tracking error signal, and the direction of movement of the laser spot can be detected by adding one output of a phase comparator to the other output of the phase comparator, it is not necessary to include an additional circuit for detecting the direction of movement of the laser spot as in the conventional technology.

Figure 3A:
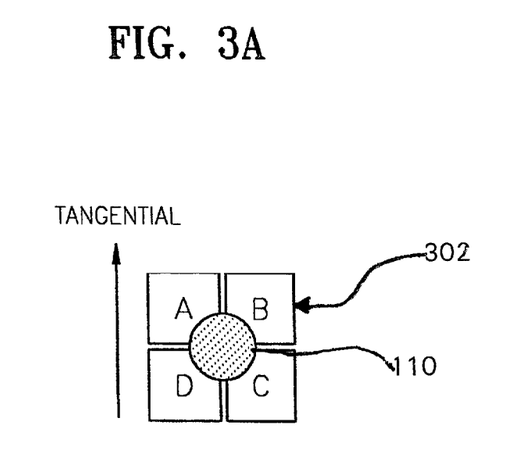
FIGS. 3A through 3B show the structure of an apparatus for generating a signal for detecting the direction of movement according to the present invention.
Figure 3B:
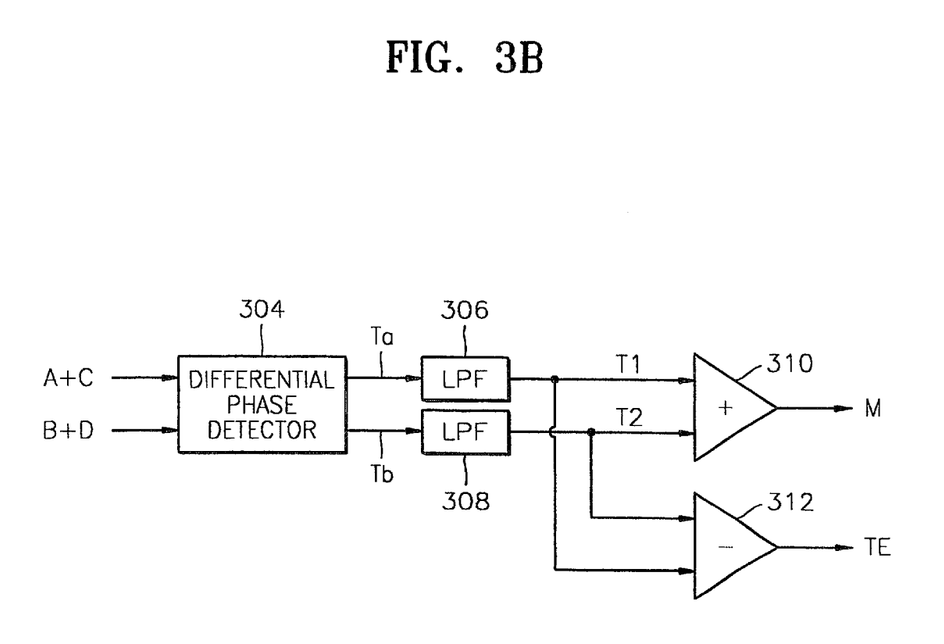

FIGS. 3A and 3B show the structure of an apparatus for generating a signal for detecting the direction of movement of a laser spot according to the present invention. FIG. 3A shows a quarter photodetector 302 and FIG. 3B shows the structure of an apparatus for obtaining a direction detecting signal M using the light receiving signals generated by the quarter photodetector 302.

In FIG. 3A, a tangential direction refers to the direction in which a pit stream is recorded on a track of a disc, and a radial direction refers to the direction perpendicular to the tangential direction and parallel to the surface of the disk. In the apparatus shown in FIG. 3B, a differential phase detector 304 detects the phase difference between sum signals A+C and B+D of the signals generated by diagonally adjacent light receiving devices A and C and diagonally adjacent receiving devices B and D in a quarter photodetector 302. The differential phase detector 304 outputs a first phase difference signal Ta when the phase of the signal A+C leads the phase of the signal B+D, and outputs a second phase difference signal Tb when the phase of the sum signal A+C lags the phase of the sum signal B+D. Reference numeral 110 denotes an optical spot.

The first and second phase difference signals Ta and Tb generated by the differential phase detector 304 are integrated by low pass filters 306 and 308.

The integrated phase difference signals T1 and T2 are respectively output from the low pass filters 306 and 308, and are processed by an adder 310 and a subtracter 312. The output of the adder 310 becomes the direction detecting signal M, and the output of the subtracter 312 becomes the tracking error signal TE. A tracking error signal detecting apparatus, which comprises the differential phase detector 304 and the subtracter 312, corresponds to the tracking error detecting apparatus according to the DPD method.

Figure 4:
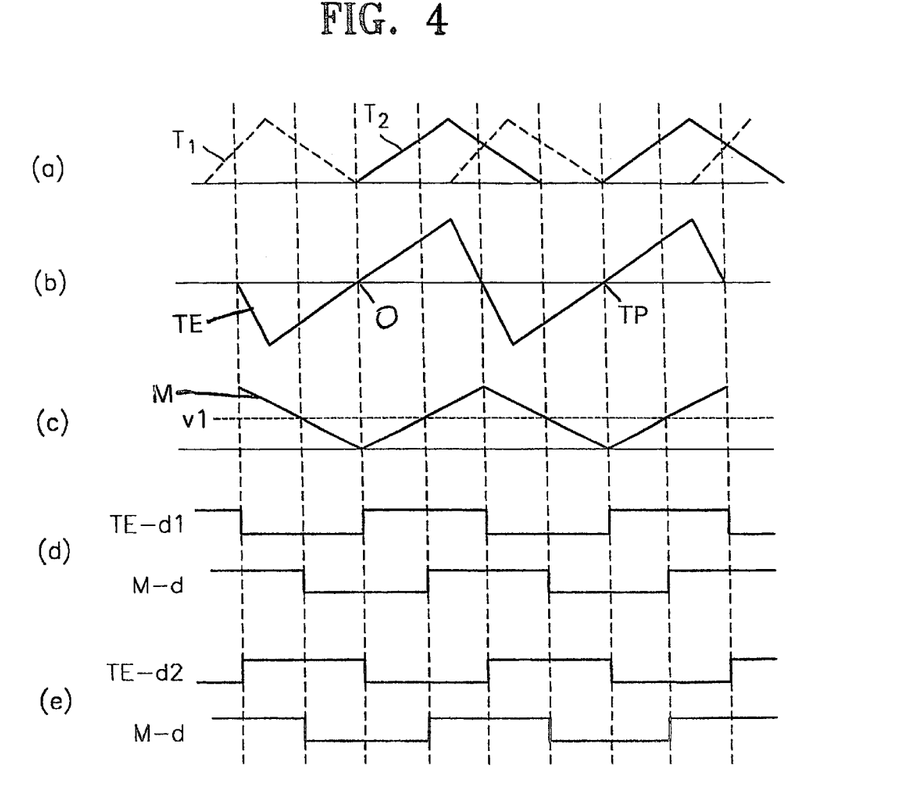
FIGS. 4A through 4E show waveforms that schematically illustrate the method for detecting the direction of movement of a laser spot, according to the present invention.

FIGS. 4A through 4E show waveforms to schematically illustrate the method for detecting the direction of movement of the laser spot according to the present invention. FIG. 4A shows the waveforms of the signals T1 and T2 obtained by integrating the first and second phase difference signals Ta and Tb by the low pass filters 306 and 308. FIG. 4B shows the waveform of the tracking error signal TE generated by the subtracter 312 shown in FIG. 3B. FIG. 4C shows the waveform of the first phase signal M generated by the adder 310 shown in FIG. 3B. FIG. 4D shows the waveforms of the signals obtained by binarizing the tracking error signal TE shown in FIG. 4B and the direction detecting signal M shown in FIG. 4C when the laser spot moves toward the outer circumference and toward the inner circumference of a disc, respectively.

The differential phase detector 304 shown in FIG. 3B generates the first phase difference signal Ta when the phase of the signal A+C leads the phase of the signal B+D, and generates the signal Tb when the phase of the signal A+C lags the phase of the signal B+D. The first phase difference signal Ta and the second phase difference signal Tb are not simultaneously generated. The magnitudes of the first phase difference signal Ta and the second phase difference signal Tb are proportional to the magnitude of the phase difference between the signal A+C and the signal B+D.

The signals T1 and T2 are obtained by integrating the first phase difference signal Ta and the second phase difference signal Tb obtained by the differential phase detector 304.

The reason why the signals T1 and T2 shown in FIG. 4A are generated is that the phase relationship between the light receiving signals generated by the light receiving devices segmented in a radial direction varies when the laser spot comes in and out of a track, since the track is in the form of pits.

The portion of FIG. 4A in which the signal T1 overlaps the signal T2 in the middle of FIG. 4A, corresponds to when a track changes. At this point, either the first phase difference signal Ta or the second phase difference signal Tb is generated by the differential phase detector 304. However, the signals T1 and T2 can simultaneously exist since the signal T1 and the signal T2 are obtained by integrating the first phase difference signal Ta and the second phase difference signal Tb, respectively.

In FIG. 4B, the position marked with 0 denotes the center of the track, and the position marked with Tp denotes the center of the next adjacent track and corresponds to a track pitch. The tracking error signal TE shown in FIG. 4B is a signal obtained by subtracting one output of the differential phase detector 304 from the other output of the differential phase detector 304. The polarity of the tracking error signal TE changes according to whether the laser spot moves toward the outer or inner circumference of the disc.

The direction detecting signal M shown in FIG. 4C is a symmetrical signal obtained by summing the outputs of the differential phase detector 304. The polarity of the first phase signal M does not change.

It is preferable that the direction detecting signal M has the value 0 in the center of the track. However, the direction detecting signal M has an offset proportional to a tilt angle when the disk is tilted. It is possible to control a tilt servo using the offset.

FIG. 4D shows a method for detecting a phase when the laser spot moves toward the outer circumference of a disc. In FIG. 4D, TE_d1 is a signal obtained by binarizing the signal TE of FIG. 4B on the basis of a center voltage, and M_d is a signal obtained by binarizing the direction detecting signal M shown in FIG. 4C on the basis of V1 having a uniform magnitude. As shown in FIG. 4D, TE_d1 is a pulse signal whose phase always leads the phase of the signal M_d by about 90°.

FIG. 4E describes a method for detecting a phase when the laser spot moves toward the inner circumference of a disc. In FIG. 4E, TE_d2 is a signal obtained by binarizing the signal TE on the basis of the center voltage, and M_d is a signal obtained by binarizing the direction detecting signal M shown in FIG. 4C on the basis of V1 having a uniform magnitude. As shown in FIG. 4E, TE_d2 is a pulse signal whose phase always lags the phase of the signal M_d by about 90°. This is because the polarity of the signal TE is reversed as shown in FIG. 4B when the laser spot moves toward the inner circumference of the disc.

Figure 5:
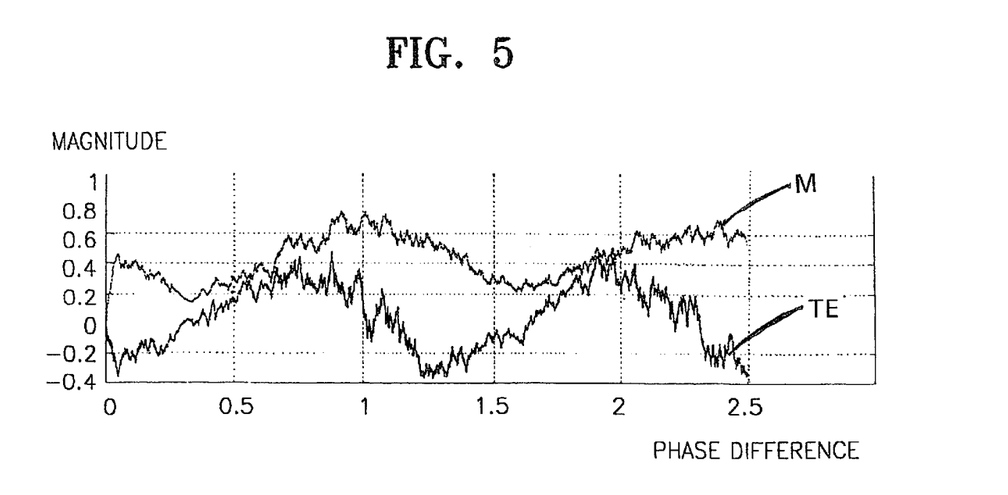
FIG. 5 is a graph showing results obtained by measuring a direction detecting signal M and a tracking error signal TE, in the method for detecting the direction of movement of a laser spot, according to the present invention.

FIG. 5 is a graph showing the results obtained by measuring the direction detecting signal M and the tracking error signal TE, in the method for detecting the direction of movement of the laser spot, according to the present invention. In FIG. 5, the lower signal is the tracking error signal TE measured in the state of focus on and tracking off, and the upper signal is the direction detecting signal M.

The measurement results shown in FIG. 5 are obtained using the photodetector 302 shown in FIG. 3A and the apparatus shown in FIG. 3B. The wavelength of the laser used for the measurement is 400 nm, the track pitch is 0.38 µm, and the numerical aperture (NA) of the optical pick-up lens is 0.6.

It is noted that the results shown in FIG. 5 coincide with the phase relationships shown in FIGS. 4A and 4B.

If Tw is the period of the channel clock of the optical disc recording/reproducing apparatus, and Δt is the detected average phase difference time, it is preferable that when the laser spot deviates from the center of the pit stream by 0.1 µm, the minimum value of Δt/Tw is 0.5.

In addition, if Mv1 and Mv2 are the maximum and minimum values of the direction detecting signal M, respectively, it is preferable that the minimum value of (Mv1−Mv2)/(Mv1+Mv2) is 0.8.

Figure 6A:
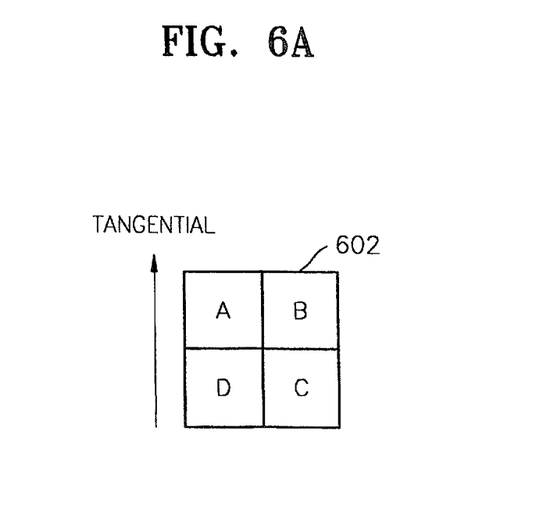
FIGS. 6A and 6B are block diagrams showing the structure of a first embodiment of an apparatus for detecting the direction of movement of a laser spot, according to the present invention.
Figure 6B:
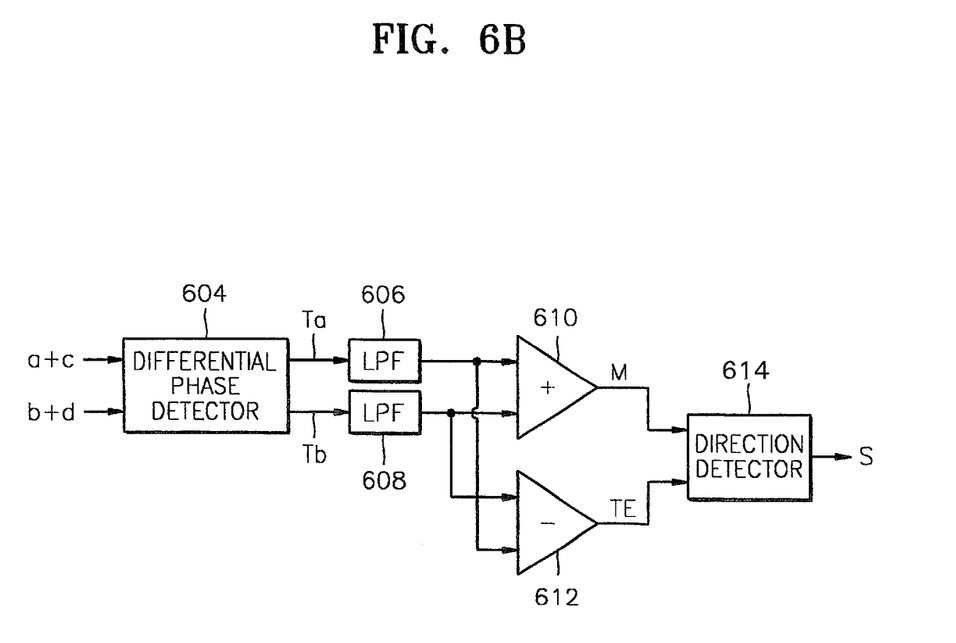

FIGS. 6A and 6B are block diagrams showing the structure of an apparatus for detecting the direction of movement of the laser spot according to an embodiment of the present invention. The apparatus shown in FIGS. 6A and 6B detects the direction of movement of the laser spot using the light receiving signals generated by a quarter photodetector 602. The apparatus shown in FIGS. 6A and 6B includes the quarter photodetector 602, the differential phase detector 604, low pass filters 606 and 608, an adder 610, a subtracter 612, and a direction detector 614.

The differential phase detector 604 detects the phase difference between sum signals A+C and B+D of the signals generated by diagonally adjacent light receiving devices A and C and diagonally adjacent light receiving devices B and D in the quarter photodetector 602.

The first and second phase difference signals Ta and Tb detected by the differential phase detector 604 are integrated by the low pass filters 606 and 608.

The adder 610 generates the sum signal of the integrated phase difference signals T1 and T2, and provides the sum signal as the direction detecting signal M. The subtracter 612 generates the sum signal of the phase difference signals T1 and T2, and provides the sum signal as the tracking error signal TE. The apparatus for generating the tracking error signal TE, which comprises differential phase detector 604 and the subtracter 612, generates the tracking error signal TE according to the DPD method.

The direction detector 614 receives the direction detecting signal M and the tracking error signal TE, detects the phase relationship between the first phase difference signal M and the tracking error signal TE, and generates a detection signal S according to the detection result. The detection signal S is a binary signal, and indicates whether the direction of movement of the laser spot is toward the outer or inner circumference of the disk.

While not shown, the tracking error signal TE input to the direction detector 614 can be generated by another type of tracking error signal detecting apparatus.

Figure 7:
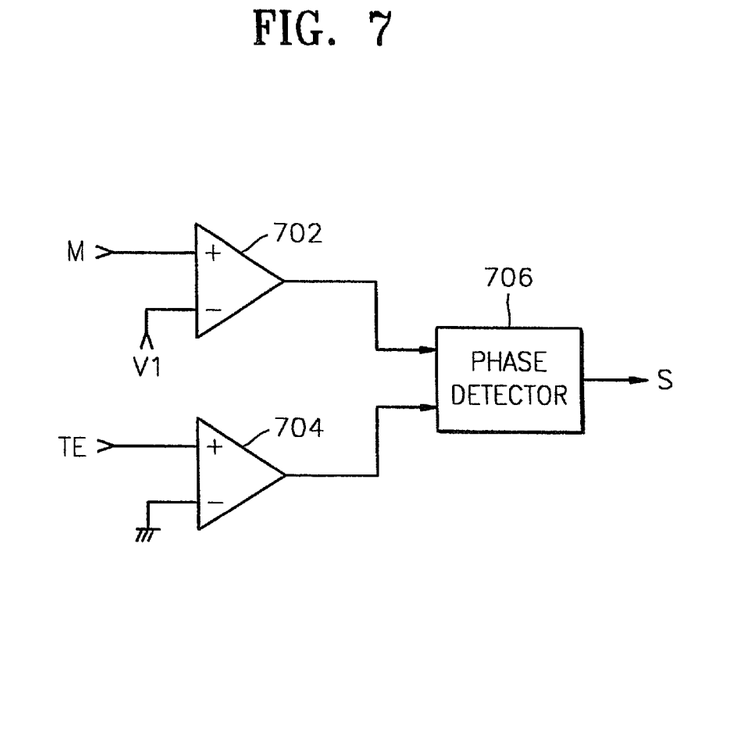
FIG. 7 is a block diagram showing the detailed structure of the direction detector shown in FIG. 6.

FIG. 7 is a block diagram showing the detailed structure of the direction detector 614 shown in FIG. 6. The direction detector 614 shown in FIG. 7 includes comparators 702 and 704, and a phase detector 706. The first comparator 702 compares the direction detecting signal M provided by the adder 610 shown in FIG. 6 with a uniform value V1, and generates the binarized direction detecting signal M_d shown in FIG. 4D or 4E according to the comparison result. The second comparator 704 compares the tracking error signal TE provided by the subtracter 612 shown in FIG. 6 with the center value, and generates one of the binarized tracking error signals TE_d1 and TE_d2 shown in FIGS. 4D and 4E according to the comparison result. For example, when the tracking error signal TE fluctuates up and down on the basis of 0V as the center value, 0V becomes the center value as shown in FIG. 7.

The phase detector 706 detects whether the phase of the binarized direction detecting signal M_d provided by the first comparator 702 leads or lags the phase of the binarized tracking error signal TE_d1 and TE_d2 provided by the second comparator 704, and outputs the detection result as the detection signal S.

The phase detector 706 can generate the detection signal S to be at a logic high level when the phase of the binarized tracking error signal TE_d1 leads the phase of the binarized first phase difference signal M_d by about 90°, in order to show that the laser spot is moving toward the outer circumference of the disc, and a logic low level when the phase of the binarized tracking error signal TE_d1 lags the phase of the binarized first phase difference signal M_d by about 90°, in order to show that the laser spot is moving toward the inner circumference of the disc.

Figure 8A:
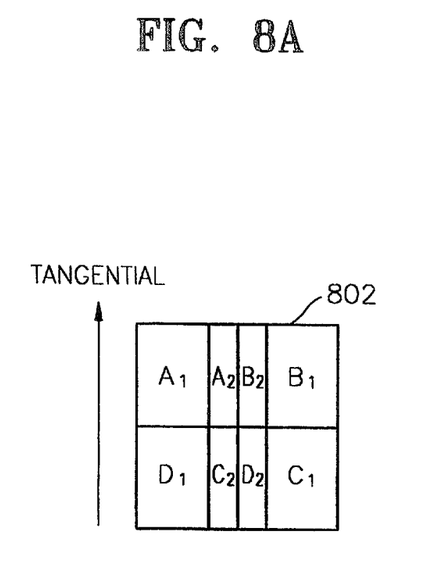
FIGS. 8A and 8B are block diagrams showing the structure of a second embodiment of the apparatus for detecting the direction of movement of a laser spot, according to the present invention.
Figure 8B:
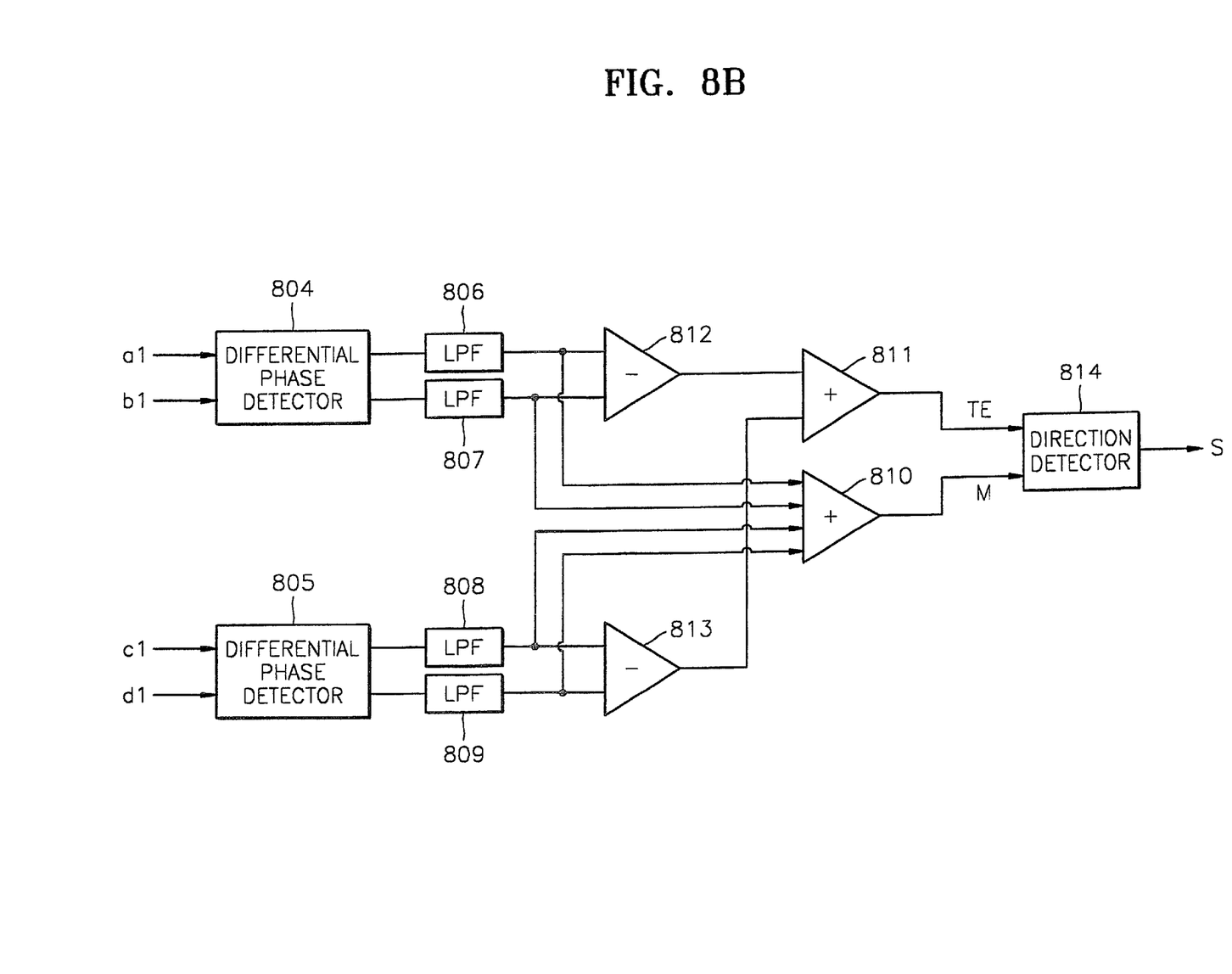

FIGS. 8A and 8B are block diagrams showing the structure of another apparatus for detecting the direction of movement of the laser spot according to an embodiment of the present invention. The apparatus shown in FIGS. 8A and 8B detects the direction of movement of the laser spot using the light receiving signals generated by the outside light receiving devices of an octant photodetector 802.

The apparatus shown in FIGS. 8A and 8B includes the octant photodetector 802, differential phase detectors 804 and 805, low pass filters 806, 807, 808, and 809, adders 810 and 811, subtracters 812 and 813, and a direction detector 814.

A first differential phase detector 804 detects the phase difference between light receiving signals a1 and b1 generated by light receiving devices A1 and B1 positioned at adjacent corners positioned farthest along in the tangential direction. The detected third and fourth phase difference signals are integrated through the low pass filters 808 and 809.

The second differential phase detector 805 detects the phase difference between light receiving signals c1 and d1 generated by light receiving devices C1 and D1 positioned on the lower side and outside in the tangential direction the detected fifth and sixth phase difference signals are integrated through the low pass filters 808 and 809.

The first adder 810 generates the sum signal of the third through sixth phase difference signals generated by the first differential phase detector 804 and the second differential phase detector 805, and provides the sum signal as the direction detecting signal M.

The first subtracter 812 subtracts the fourth phase difference signal generated by the first differential phase detector 804 from the third phase difference signal generated by the first differential phase detector 804. The second subtracter 813 subtracts the sixth phase difference signal generated by the second differential phase detector 805 from the fifth phase difference signal generated by the second differential phase detector 805. The second adder 811 generates the sum signal of the signals provided by the first subtracter 812 and the second subtracter 813, and provides the sum signal as the tracking error signal TE.

The direction detector 814 receives the direction detecting signal M and the tracking error signal TE, detects the phase relationship between the first phase difference signal M and the tracking error signal TE, and generates the detection signal S according to the detection result.

While not shown, the tracking error signal TE input to the direction detector 814 can be generated by another type of tracking error signal detecting apparatus.

Figure 9A:
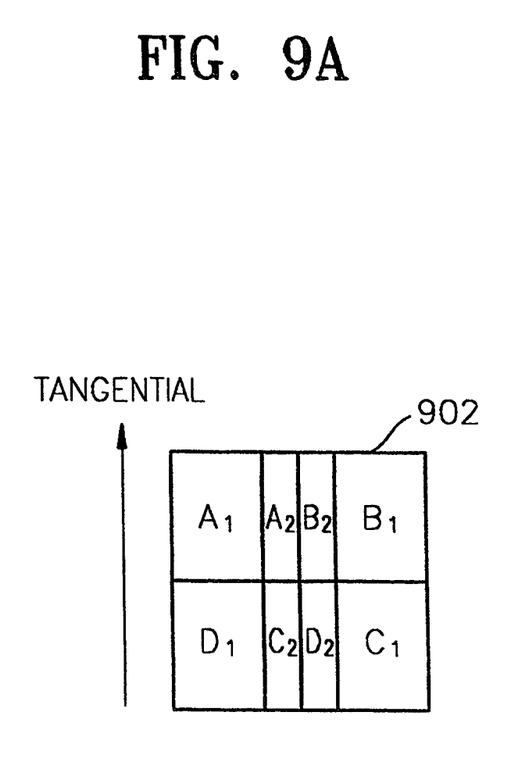
FIGS. 9A and 9B are block diagrams showing the structure of a third embodiment of the apparatus for detecting the direction of movement of a laser spot, according to the present invention.
Figure 9B:
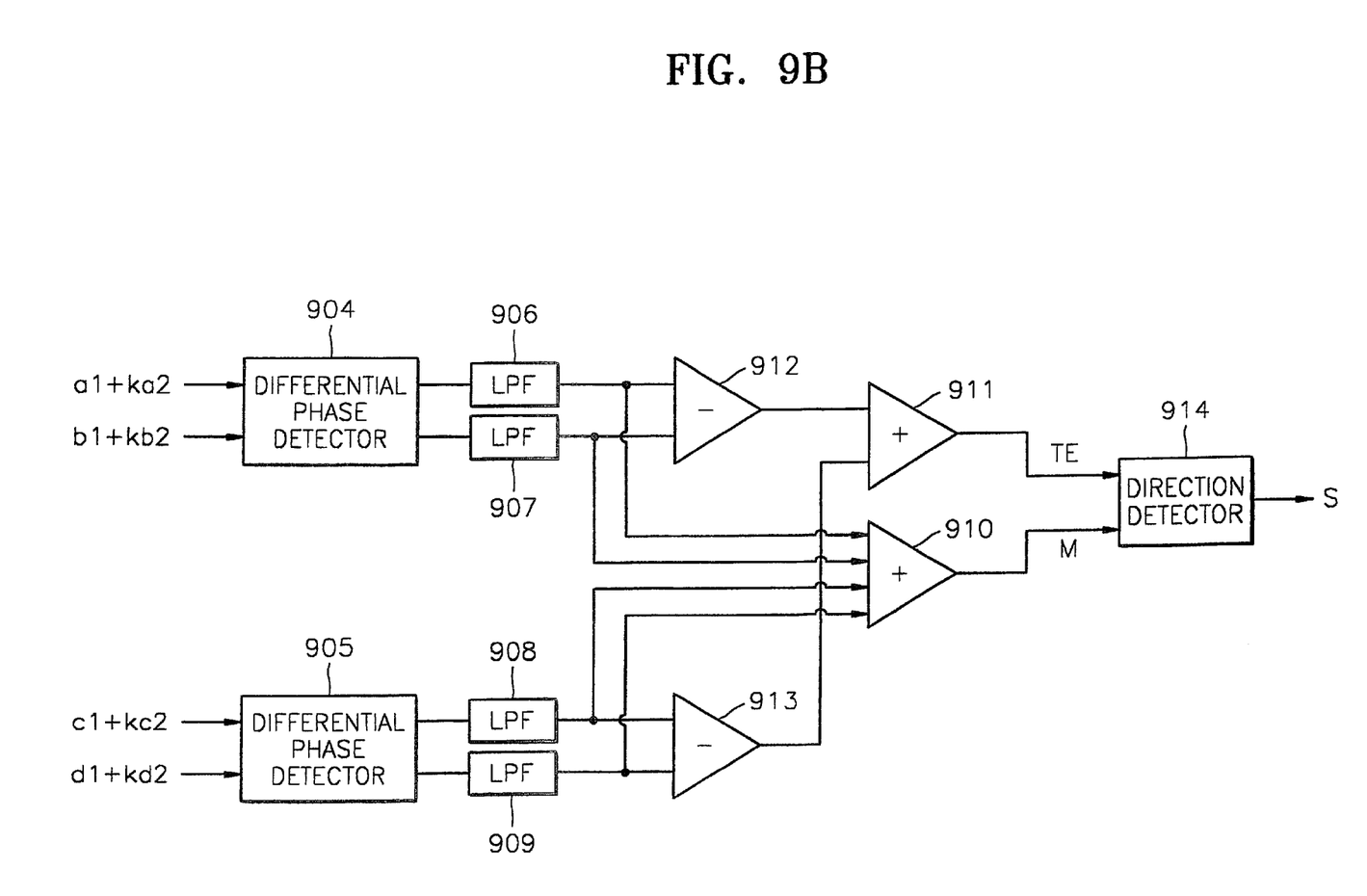

FIGS. 9A and 9B are block diagrams showing the structure of another embodiment of the apparatus for detecting the direction of movement of the laser spot according to the present invention. The apparatus shown in FIGS. 9A and 9B detects the direction of movement of the laser spot using the light receiving signals generated by the light receiving devices of an octant photodetector 902.

The apparatus shown in FIGS. 9A and 9B include the octant photodetector 902, differential phase detectors 904 and 905, low pass filters 906, 907, 908, and 909, adders 910 and 911, subtracters 912 and 913, and a direction detector 914.

The first differential phase detector 904 detects the phase difference between the light receiving signals a1+ka2 and b1+kb2 generated by the light receiving devices A1, A2, B1, and B2 positioned along the upper side of the octant photodetector 902, farthest along in the tangential direction. The amplification coefficient k, which is not 0, denotes the degree of amplification. The detected phase difference signals are integrated through the low pass filters 906 and 907.

The second differential phase detector 905 detects the phase difference between the light receiving signals c1+kc2 and d1+kd2 generated by the light receiving devices C1, C2, D1, and D2 positioned along the lower side of the octant photodetector 902. k, which is not 0, denotes the degree of amplification. The detected phase difference signals are integrated through the low pass filters 908 and 909.

The first adder 910 generates the sum signal of the phase difference signals generated by the first differential phase detector 904 and the second differential phase detector 905 and provides the sum signal as the direction detecting signal M.

The first subtracter 912 subtracts one phase difference signal generated by the first differential phase detector 904 from the other phase difference signal generated by the first differential phase detector 904. The second subtracter 913 subtracts one phase difference signal generated by the second differential phase detector 905 from the other phase difference signal generated by the second differential phase detector 905. The second adder 911 generates the sum signal of the signals provided by the first subtracter 912 and the second subtracter 913, and provides the sum signal as the tracking error signal TE.

The direction detector 914 receives the direction detecting signal M and the tracking error signal TE, detects the phase relationship between the first phase difference signal M and the tracking error signal TE, and generates the detection signal S according to the detection result.

The octant photodetector used in the apparatus shown in FIGS. 8A and 9A are divided into two sections in the tangential direction of the disc and into four sections in the radial direction of the disc so that each of the two internal sections has a width corresponding to a track pitch.

Figure 10:
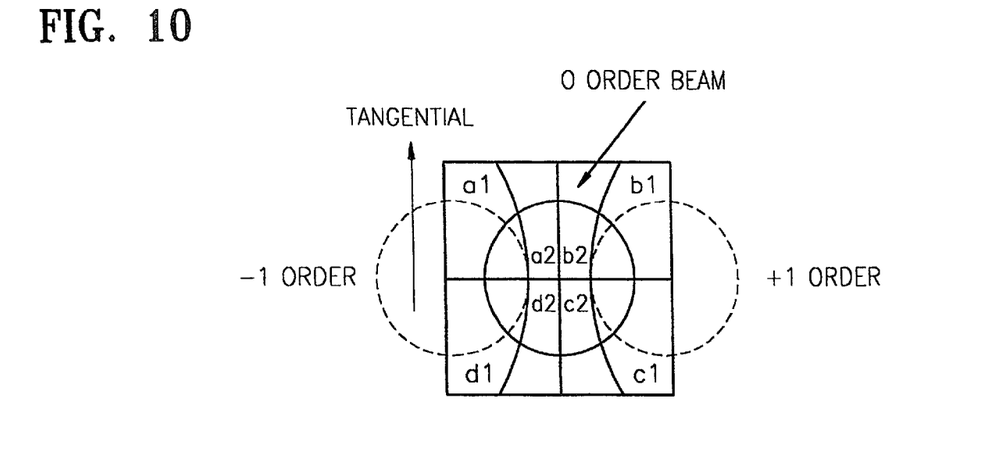
FIGS. 10 through 12 show photodetectors that can be used for the apparatus for detecting the direction of movement of a laser spot, according to the present invention.
Figure 11:
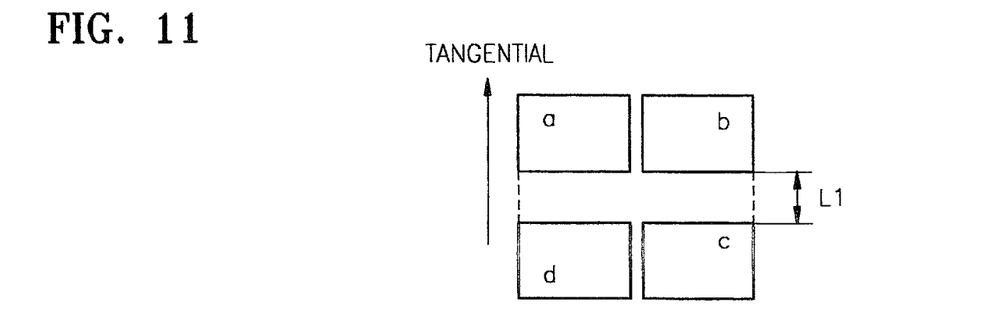
Figure 12:
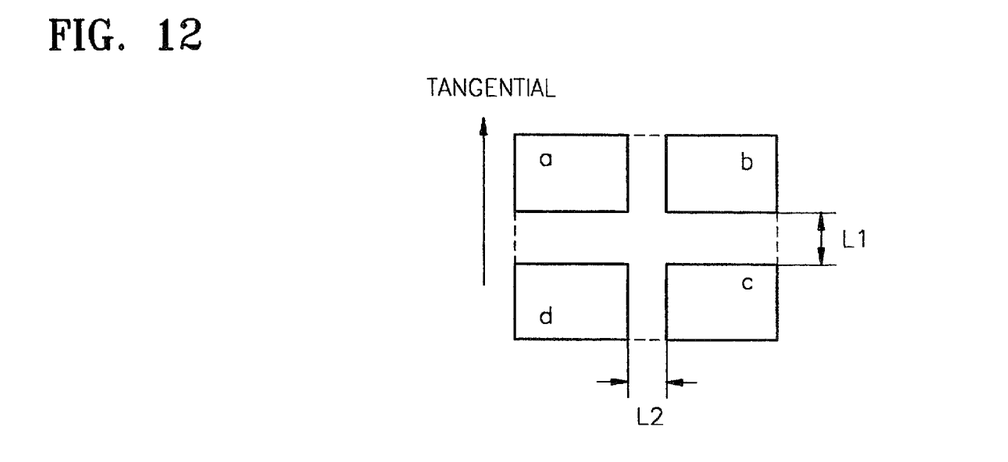

Alternative photodetectors having the various structures shown in FIGS. 10 through 12 can be used in the apparatus for detecting the direction of movement of the laser spot according to the present invention. The photodetector shown in FIG. 10 is divided into two sections in the tangential direction of a disc, and is divided into four sections in the radial direction of the disc so that the internal light receiving devices have a uniform degree of curvature.

The photodetector shown in FIG. 11 is divided into two sections separated from each other by a uniform distance L1 in the tangential direction, and into two sections in the radial direction of the disc.

The photodetector shown in FIG. 12 is divided into two sections separated from each other by a uniform distance L1 in the tangential direction, and is divided into two sections to be separated from each other by a uniform distance L2 in the radial direction of the disc.

In describing the embodiment of the present invention, the quarter photodetectors (FIGS. 3B, 6B, 11, and 12) and the octant photodetectors (FIGS. 8A, 9A, and 10) were taken as examples. However, the methods and apparatuses of the present invention can be basically applied to a bipartite photodetector.

As mentioned above, in the method for detecting the direction of movement of the laser spot according to an embodiment of the present invention, it is possible to correctly detect the direction of movement of the laser spot even when the track pitch is smaller than the size of the laser spot since the direction of movement of the laser spot is detected by comparing the phase of the first phase signal with the phase of the track error signal, where the first phase signal and the track error signal are obtained by detecting the phase difference between the light receiving signals generated by the light receiving devices consisting of divided into two sections of the photodetector.

Also, since the apparatus for detecting the direction of movement of the laser spot according to the present invention can be used together with the apparatus for obtaining the track error signal by the DPD method, the circuit for detecting the direction of movement of the laser spot becomes simpler.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for generating a signal for detecting a direction of movement of a laser spot in an optical disc recording/reproducing apparatus having a photodetector divided into sections, each of which is a light receiving device aligned in a radial direction, the method comprising:

detecting a phase difference between light receiving signals corresponding to light receiving devices of the photodetector, and obtaining a first phase difference signal that indicates the degree to which the phase of the light receiving signal corresponding to a first light receiving device in the radial direction leads the phase of the light receiving signal corresponding to a second light receiving device; and a second phase difference signal that indicates the degree to which the phase of the light receiving signal corresponding to the second light receiving device leads the phase of the light receiving signal corresponding to the first light receiving device;

integrating the first and second phase difference signals; and adding the integrated first and second phase difference signals to each other to obtain a direction detecting signal.

2. The method of claim 1, further comprising detecting the direction of movement of the laser spot according to whether a phase of the direction detecting signal leads or lags a phase of a tracking error signal.

3. The method of claim 2, wherein the photodetector comprises a quarter photodetector divided in the radial and tangential directions of a disc into four sections A, B, C, and D, each of which is a light receiving device, and wherein said detecting the phase difference comprises generating the first phase difference signal that indicates the degree to which the phase of a signal corresponding to the sum of the light receiving signals corresponding to diagonally adjacent light receiving devices A and C leads the phase of a signal corresponding to the sum of the light receiving signals corresponding to diagonally adjacent light receiving devices B and D, and the second phase difference signal that indicates the degree to which the phase of the signal corresponding to the sum of the light receiving signals corresponding to the diagonally adjacent light receiving devices B and D leads the phase of the signal corresponding to the sum of the light receiving signals corresponding to the diagonally adjacent light receiving devices A and C.

4. The method of claim 2, wherein the photodetector comprises an octant photodetector divided in the radial and tangential directions of a disc, into eight sections, each of which is a light receiving device, and wherein said detecting the phase difference comprises obtaining a third phase difference signal that indicates the degree to which the phase of a signal corresponding to the sum of light receiving signals corresponding to outside light receiving devices positioned at adjacent corners of the octant photodetector farthest along in the tangential direction leads the phase of a signal corresponding to the sum of light receiving signals corresponding to outside light receiving devices positioned at adjacent corners of the octant photodetector least advanced in the tangential direction, and a fourth phase signal that indicates the degree to which the phase of a signal corresponding to the sum of light receiving signals corresponding to the outside light receiving devices positioned at adjacent corners of the octant photodetector least advanced in the tangential direction leads the phase of a signal corresponding to the sum of light receiving signals corresponding to the outside light receiving devices positioned at adjacent corners of the octant photodetector farthest along in the tangential direction, obtaining a fifth phase difference signal indicating the degree to which the phase of a signal corresponding to the sum of light receiving signals corresponding to inside light receiving devices positioned on the side of the octant photodetector farthest advanced in the tangential direction leads the phase of a signal corresponding to the sum of light receiving signals corresponding to inside light receiving devices positioned on the side of the octant photodetector least advanced in the tangential direction, and a sixth phase signal that indicates the degree to which the phase of a signal corresponding to the sum of light receiving signal corresponding to the inside light receiving devices positioned on the side of the octant photodetector least advanced in the tangential direction leads the phase of a signal corresponding to the sum of light receiving signals corresponding to the inside light receiving devices positioned on the side of the octant photodetector, farthest advanced in the tangential direction, and obtaining the first phase difference signal by adding the third phase difference signal to the fifth phase difference signal, and the second phase difference signal by adding the fourth phase difference signal to the sixth phase difference signal.

5. The method of claim 4, further comprising adding the light receiving signals corresponding to the outside light receiving devices (A1, B1, C1, and D1) of the octant photodetector to the light receiving signals corresponding to the inside light receiving devices (A2, B2, C2, and D2) of the octant photodetector.

6. The method of claim 5, wherein a predetermined amplification coefficient k is applied to the light receiving signals corresponding to the inside light receiving devices A2, B2, C2, and D2 of the octant photodetector.

7. The method of claim 2, wherein if the laser spot deviates from a center of a pit stream recorded on an optical disc by 0.1 $\mu$m, the minimum value of $\Delta t/Tw$ is approximately 0.5, where Tw is a period of a channel clock of the optical disc recording/reproducing apparatus, and $\Delta t$ is a detected average phase difference time.

8. The method of claim 2, wherein a minimum value of $(Mv1-Mv2)/(Mv1+Mv2)$ is approximately 0.8, where Mv1 and Mv2 are maximum and minimum values of the direction detecting signal, respectively.

9. The method of claim 1, further comprising controlling a tilt servo mechanism in accordance with the direction detecting signal.

10. The method of claim 9, wherein said controlling the tilt servo mechanism comprises controlling the tilt servo mechanism in accordance with an offset of the direction detecting signal.

11. The method of claim 2, further comprising subtracting the integrated first and second phase difference signals to obtain the tracking error signal.

12. The method of claim 2, further comprising obtaining the tracking error signal from a tracking error detector.

13. The method of claim 12, wherein the tracking error detector calculates the tracking error signal using a differential phase detection method.

14. An apparatus for generating a signal for detecting the direction of movement of a laser spot in an optical disc recording/reproducing apparatus having a photodetector divided into sections, each of which is a light receiving device, aligned in a radial direction and generating light receiving signals corresponding to the intensity of the laser spot reflected from a disc, the apparatus comprising:

a differential phase detector to detect a phase difference between the light receiving signals corresponding to the light receiving devices of the photodetector, wherein said differential phase detector detects a first phase difference signal that indicates a degree to which a phase of a light receiving signal corresponding to a first light receiving device farthest advanced in the radial direction leads the phase of a light receiving signal corresponding to a second light receiving device; and a second phase difference signal that indicates the degree to which a phase of the light receiving signal corresponding to the second light receiving device leads the phase of the light receiving signal corresponding to the first light receiving device;

first and second integrators to integrate the first and second phase difference signals detected by said differential phase detector; and an adder that generates a direction detecting signal that detects a direction of movement of the laser spot by adding the integrated phase difference signals integrated by said first and second integrators, respectively.

15. The apparatus of claim 14, further comprising a direction detector to detect the direction of movement of the laser spot according to whether a phase of the direction detecting signal provided by said adder leads or lags a phase of a tracking error signal.

16. The apparatus of claim 15, wherein said direction detector comprises:

a first binarizer to binarize the direction detecting signal provided by said adder by a predetermined threshold value;

a second binarizer to binarize the tracking error signal by a center value; and a phase detector to detect the direction of movement of the laser spot according to whether a phase of the binarized direction detecting signal provided by the first binarizer leads or lags the phase of a binarized track error signal provided by the second binarizer.

17. The apparatus of claim 16, wherein the photodetector is a quarter photodetector divided in the radial and tangential directions of a disc, into four sections A, B, C, and D, each of which is a light receiving device, and wherein said differential phase detector detects a phase difference between a signal corresponding to the sum of the light receiving signals corresponding to diagonally adjacent light receiving devices A and C and a signal corresponding to the sum of the light receiving signals corresponding to diagonally adjacent light receiving devices B and D.

18. The apparatus of claim 17, wherein the quarter photodetector is divided into two sections separated from each other by a predetermined distance L1.

19. The apparatus of claim 17, wherein the quarter photodetector is divided into two sections separated from each other by a predetermined distance L1 in the tangential direction of the disc, and is divided into two sections separated from each other by a predetermined distance L2 in the radial direction of the disc.

20. The apparatus of claim 14, wherein:

the photodetector comprises an octant photodetector divided in the radial and tangential directions of the disc into eight sections, each of which is a light receiving device, and generating light receiving signals corresponding to the light intensity of the laser spot reflected from the disc;

the differential phase detector comprises first and second differential phase detectors;

the first differential phase detector detects the phase difference between the light receiving signals corresponding to light receiving devices A1 and B1 positioned at adjacent corners of the octant photodetector, farthest along in the tangential direction; and generates a third phase difference signal that indicates a degree to which the phase of a first light receiving signal leads the phase of a second light receiving signal, and a fourth phase difference signal showing a degree to which the phase of the second light receiving signal leads the phase of the first light receiving signal;

the first and second integrators integrate the third and fourth phase difference signals generated by said first differential phase detector;

the second differential phase detector detects a phase difference between the light receiving signals corresponding to light receiving devices C1 and D1 positioned at adjacent corners of the octant photodetector, least advanced in the tangential direction; and generates a fifth phase difference signal showing a degree to which a phase of the first light receiving signal leads the phase of the second light receiving signal, and a sixth phase difference signal showing the degree to which the phase of the second light receiving signal leads the phase of the first light receiving signal;

third and fourth integrating integrators to integrate the fifth and sixth phase difference signals generated by said second differential phase detector;

the adder generates the direction detecting signal that detects the direction of movement of the laser spot by adding the integrated phase difference signals integrated by said first through fourth integrators; and the apparatus further comprises a direction detector that detects the direction of movement of the laser spot according to whether a phase of the direction detecting signal generated by said adder leads or lags a tracking error signal.

21. The apparatus of claim 20, wherein said direction detector comprises:

a first binarizer that binarizes the direction detecting signal provided by said adder by a predetermined threshold value;

a second binarizer that binarizes the tracking error signal by a center value; and a phase detector that detects the direction of movement of the laser spot according to whether the phase of the binarized direction detecting signal provided by the first binarizer leads or lags the binarized tracking error signal provided by the second binarizer.

22. The apparatus of claim 20 wherein said first phase detector detects a phase difference between sum signals a1+a2 and b1+b2 obtained by adding the light receiving signals corresponding to the light receiving devices A1 and B1 positioned at adjacent corners of the octant photodetector, farthest along in the tangential direction, to the light receiving signals corresponding to light receiving devices A2 and B2 positioned between the light receiving devices A1 and B1, and said second differential phase detector detects a phase difference between sum signals c1+c2 and d1+d2 obtained by adding the light receiving signals corresponding to the light receiving devices C1 and D1 positioned at adjacent corners of the octant photodetector, least advanced in the tangential direction, to the light receiving signals corresponding to light receiving devices C2 and D2 positioned between the light receiving devices C1 and D1.

23. The apparatus of claim 20, wherein the octant photodetector is divided into two sections in the tangential direction of a disc, and into four sections in the radial direction of a disc so that, among the eight sections, the internal light receiving devices have a uniform degree of curvature.

24. The apparatus of claim 14, further comprising a tilt servo mechanism, wherein said tilt servo mechanism controls a tilt of the optical disc in accordance with the direction detecting signal.

25. The apparatus of claim 14, further comprising a tilt servo mechanism, wherein said tilt servo mechanism controls a tilt of the optical disc in accordance with an offset of the direction detecting signal.

26. The apparatus of claim 15, further comprising a subtractor subtracting the integrated first and second phase difference signals to obtain the tracking error signal.

27. The apparatus of claim 15, further comprising a tracking error detector that obtains the tracking error signal in accordance with the direction detecting signal.

28. A method for generating a signal for detecting a direction of movement of a laser spot in an optical disc recording/reproducing apparatus, the method comprising:

detecting phase differences between light receiving signals corresponding to light receiving devices, and combining the phase differences to obtain a direction detecting signal;

detecting a phase of a track error signal; and detecting the direction of movement of the laser spot according to a comparison of a phase of the direction detecting signal and the track error signal phase.

29. The method of claim 28, wherein said detecting the direction of movement comprises determining a lead/lag relationship between the phase difference and a phase of the track error signal.

30. The method of claim 28, wherein said detecting phase differences comprises detecting a lead/lag relationship for a phase of each light receiving signal with respect to a remaining light receiving signal to obtain respective phase difference signals, and adding the phase difference signals to obtain the direction detection signal, and said detecting the phase of the track error signal comprises subtracting the phase difference signals.

31. The method of claim 30, wherein said detecting phase differences further comprises subtracting the phase difference signals to obtain the tracking error signal.

32. The method of claim 30, further comprising obtaining the tracking error signal from a tracking error detector that uses a differential phase detection method.

33. An apparatus for generating a signal for detecting a direction of movement of a laser spot in an optical disc recording/reproducing apparatus, the apparatus comprising:

a differential phase detector to detect phase differences between the light receiving signals corresponding to light receiving devices, and combining the phase differences to obtain a direction detecting signal;

a track error signal detector to detect a track error signal; and a direction detector to detect the direction of movement of the laser spot according to a comparison of a phase of the direction detecting signal and a phase of the track error signal.

* * * * *